United States Patent [19]

Grosemans et al.

[11] 3,941,392

[45] Mar. 2, 1976

[54] RECORD PLAYER

[75] Inventors: Jozef-Antoon Grosemans; Piet vander Lely; Willem Hendrik Stigter, all of Eindhoven, Netherlands

[73] Assignee: U.S. Philips Corporation, New York, N.Y.

[22] Filed: Sept. 26, 1974

[21] Appl. No.: 509,480

[30] Foreign Application Priority Data

Oct. 1, 1973 Netherlands ................ 7313450

[52] U.S. Cl. ............ 274/10 R; 274/9 B; 274/39 R
[51] Int. Cl.[2] ................ G11B 17/06; G11B 3/60
[58] Field of Search ........ 274/9 R, 9 A, 39 R, 39 A, 274/10 R

[56] References Cited
UNITED STATES PATENTS

| 3,193,296 | 7/1965 | Rockols | 274/9 A |
| 3,485,499 | 12/1969 | Fukuds | 274/9 A |
| 3,804,422 | 4/1974 | Kobashi | 274/39 A |
| 3,814,442 | 6/1974 | Van Antwerp | 274/39 A |

Primary Examiner—Houston S. Bell, Jr.
Assistant Examiner—A. J. Mirabito
Attorney, Agent, or Firm—Frank R. Trifari; David R. Treacy

[57] ABSTRACT

An automatic diameter selection device for the pickup arm of a record player. A sensing pin disposed in the turntable is depressed by records greater than a given diameter and cooperates with abutment members to move a plate between a plurality of locked positions. The plate moves only if, after a record has been placed on the turntable, the sensing pin occupies a position which differs from its previous position.

8 Claims, 7 Drawing Figures

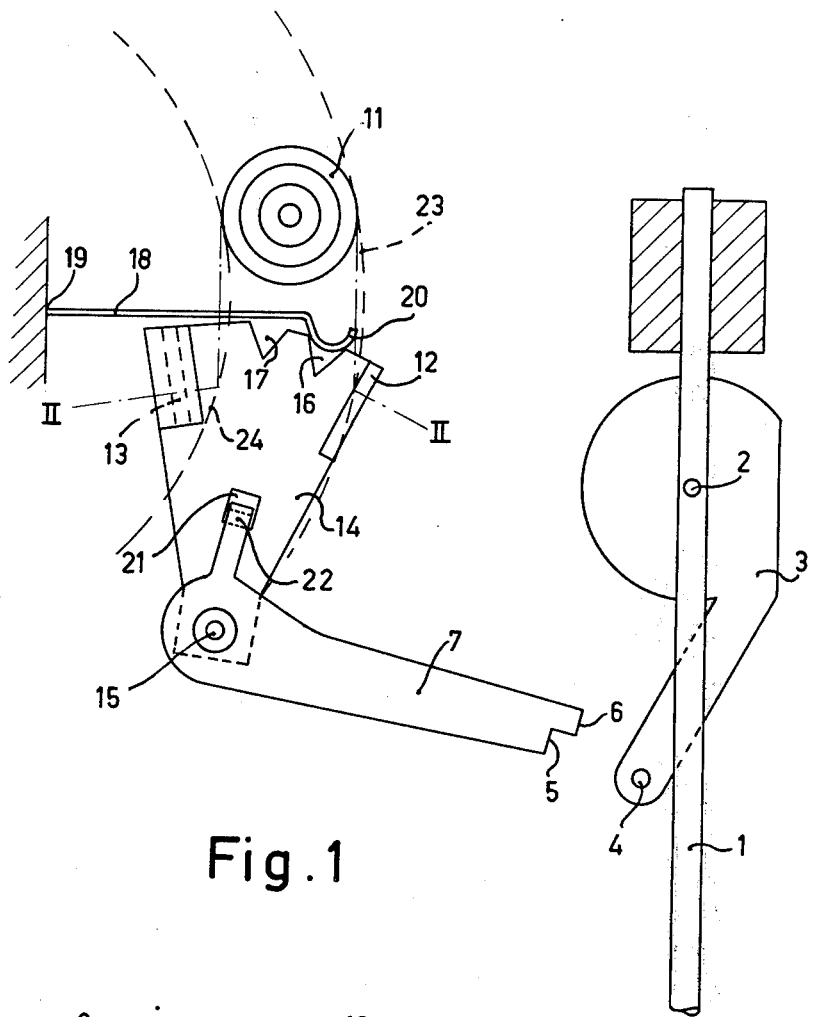
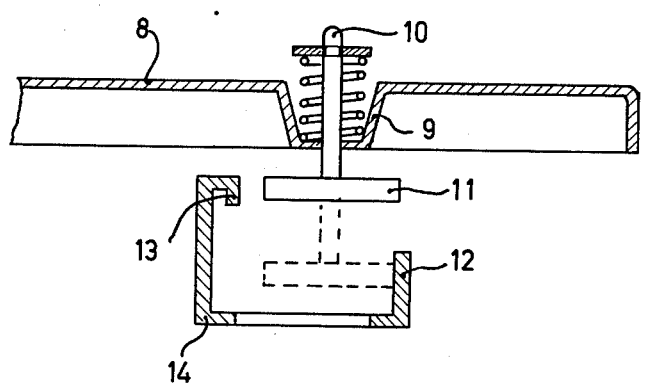
Fig. 1
Fig. 2

RECORD PLAYER

BACKGROUND OF THE INVENTION

1. Field of the Invention

The invention relates to a record player which is provided with a tone arm, a turntable and a displaceable abutment lever which during the inward pivoting movement of the arm is contacted by a stop element coupled to the arm to limit the movement in accordance with the diameter of a record placed on the turntable. The turntable accommodates at least one sensing pin which, depending upon the record diameter, is, or is not, depressed and cooperates with abutment members which are movable in accordance with the displacement of the sensing pin so as to adjust the position of the lever.

2. Description of the Prior Art

A record player of this type is described in German Patent Specification No. 1,202,522. In this known record player, each time a record is placed on the turntable at the beginning of the playing cycle the abutment lever is pivoted from an inoperative position to an operative position in order to move the abutment members into the path of the sensing pin which, depending upon whether it is or is not depressed, cooperates with the abutment members to place the abutment lever in a position corresponding to the diameter of the record. After the arm has thus been enabled automatically to select the set-down diameter corresponding to the diameter of the record placed on the turntable and the stylus has been placed in the lead-in groove of the record, the abutment lever is returned to the inoperative position outside the path of the sensing pin.

The known record player has the disadvantage that the operations of moving the abutment lever from the inoperative position to the operative position and vice versa require a control mechanism which forms part of a conventional control disc, with the result that the use of the known automatic set-down diameter selecting device is restricted to record players of the type provided with such a control disc. At the beginning of each playing cycle the sensing pin and the abutment members are brought into contact with one another, which may give rise to troublesome noise.

SUMMARY OF THE INVENTION

It is an object of the present invention to provide a record player which is provided with an automatic setdown diameter selecting device which can be operated in a more simple manner without the need for a control disc, and hence can be used in a greater variety of record-player types while the occurrence of troublesome noise is reduced to a minimum.

According to the invention the abutment members of a diameter selecting device are movable between a plurality of locked positions which each correspond to one of the different diameters of records to be played, depending upon the displacement of the sensing pin. Movement from one locked position associated with a given record diameter to another locked position associated with another record diameter is performed only if the pin, after placing of a record on the turntable, occupies a position which differs from the position it occupied during the playing of the preceding record.

An apparatus according to the invention provides the advantage that, starting from a position in which the abutment members occupy a given locked position associated with a given diameter of a record to be played, the members are displaced to another locked position only if a record of a diameter different from that of the preceding record is placed on the turntable. When records of the same diameter are consecutively played the abutment members remain in the set locked position associated with that diameter.

In a preferred embodiment of the invention the sensing pin is disposed on a rocker which is mounted on the lower surface of the turntable. Two abutment elements on the rocker are differently spaced from the turntable center and, depending upon the position of the sensing pin, alternately are at two different levels relative to the abutment members. When the sensing pin is displaced an abutment element which was on a first level occupying a raised position relative to the abutment members moves to the second level and the other abutment element of the rocker moves from the second level to the first level. The first-mentioned abutting element then engages one of the abutment members and displaces these members from a locked position to an intermediate position. Detent means are provided which move the abutment members from said intermediate position to another locked position, in which latter position the abutment element which is at the second level is clear of the abutment members, with the consequent advantage that no reaction forces can be exerted on the sensing pin.

In the preferred embodiment the position of the pivot axle of the rocker relative to the rocker and to the sensing pin is selected so that in the non depressed condition of the sensing pin the pin projects above the turntable by its own weight, and the force required to depress the sensing pin is of the order of one gram. In a further preferred embodiment two rockers are mounted on the turntable at different distances from the turntable center.

It is also preferred that the abutment members comprise two abutment surfaces which are formed on the abutment lever and coverge in the direction of rotation of the turntable. To provide a detent action the abutment lever has notches which are equal in number to the locked positions. A resilient pawl element engages one of the notches to lock the abutment surfaces. The resilient pawl element preferably is in the form of a roller mounted for free rotation on an end of a spring-loaded lever pivotably mounted in the record player.

Preferably a contact lever is also provided which is movable in accordance with the movement of the abutment members, and in the locked positions of said members cooperates with electrical contacts to set the speed of the turntable. Simultaneously with the automatic selection of the set-down diameter the speed associated with the record to be played is then automatically set. The contact lever preferably is disposed on the abutment lever.

BRIEF DESCRIPTION OF THE DRAWING

Embodiments of the invention will now be described, by way of example, with reference to the accompanying diagrammatic drawings, in which:

FIG. 1 is a plan view of a first embodiment of an automatic set-down diameter selection device according to the invention provided in a record player, FIG. 2 is a sectional view taken on the line II—II of FIG. 1.

DESCRIPTION OF THE PREFERRED EMBODIMENTS

Figure 3:
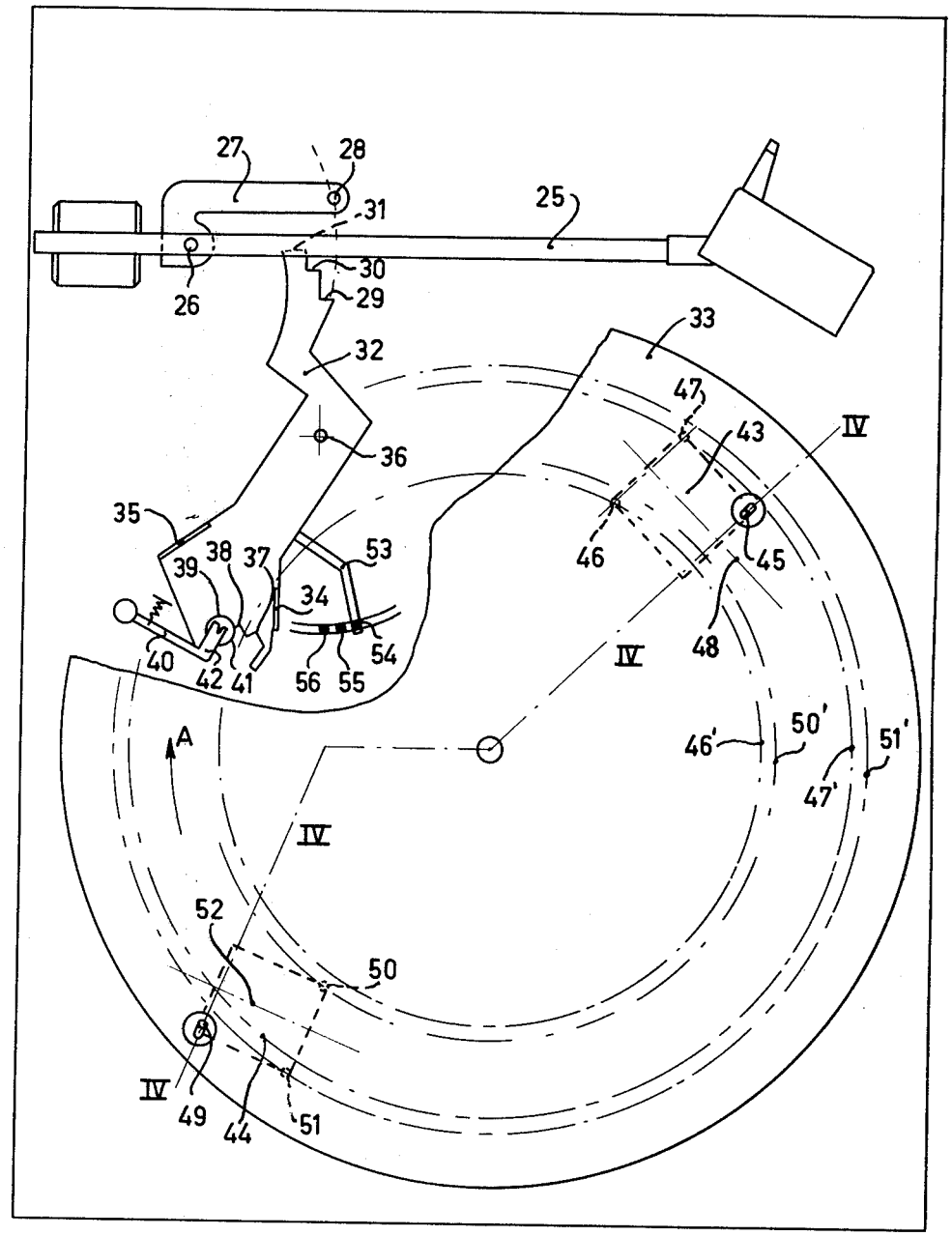
FIG. 3 is a plan view of a modified embodiment of a record player having a set-down diameter selection device according to the invention.

The first embodiment of the invention, shown in FIGS. 1 and 2, comprises a tone arm 1 which is pivotable about a spindle 2 and is coupled to a plate-shaped element 3 which follows the rotary movement of the arm. Element 3 is provided with a stop pin 4 which during inwardly directed (clockwise in the drawing) pivotable movement of the arm abuts one of steps 5 and 6 of an abutment lever 7 to limit the movement of the arm in accordance with the diameter of a record placed on a turntable 8. The abutment lever 7 has two steps 5 and 6 which serve as abutment surfaces for the pin 4, this embodiment being intended for playing records of two different diameters, for example 17 cm and 30 cm.

The turntable 8 is formed with a hole 9 in which a spring-loaded sensing pin 10 is mounted at a distance from the turntable center such that the pin 10 is not depressed by a 17 cm record but is depressed by a 30 cm record. At its end projecting below the turntable the sensing pin 10 has an increased-diameter part 11 capable of cooperating with abutment members which in accordance with the displacement of the sensing pin 10 are movable to adjust the position of the abutment lever 7 in a manner to be described hereinafter.

The abutment members comprise two bent lugs 12 and 13 of a substantially triangular plate 14 pivotable about a spindle 15. The lugs are disposed along two sides of the triangle, and the third side of the triangular plate 4 is formed with two V-shaped notches 16 and 17, one of which is engaged by a resilient pawl element 18. The pawl element 18 has the form of a leaf spring one end 19 of which is secured in the record player and the other end 20 of which is bent more or less into the shape of a V. The pivotal movement of the plate 14 is imparted to the abutment lever 7 which also is pivotable about the spindle 15. For this purpose the plate 14 has an opening 21 in which a bent lug 22 of the lever 7 fits with a small amount of clearance.

Operation of the device is as follows. FIGS. 1 and 2 show the position in which a 17 cm record lies on the turntable. The sensing pin 10 is in the raised position and the free bent end 20 of the leafspring engages in the notch 16 of the plate 14. On rotation of the turntable the outer circumference of the increased-diameter pin part 11 describes paths 23 and 24 indicated by broken lines. The Figure shows that the pin part 11 moves clear above and past the abutment lugs 12 and 13 respectively of the plate 14. The stop pin 4 will abut the abutment surface 5 of the lever 7 and hence the stylus (not shown) will automatically be stopped in a position over the lead-in groove of the 17 cm record.

If after a 17 cm record has been played another record of this diameter is played, the entire set-down diameter selection device comprising the sensing pin 10, the plate 14 with the abutment lugs 12 and 13 and the abutment lever 7 remains in the locked position shown. There is no reason for changing the position of any of these components. If after a 17 cm record has been played a 30 cm record is placed on the turntable, the sensing pin 10 is depressed and the pin part 11 engages the abutment lug 12, with the result that the plate 14 is pivoted to the right (in FIG. 1). Initially the plate 14 assumes an unstable or intermediate position and then is pivoted by the bent spring end 20 to the other locked position, the spring end 20 snapping into the notch 17. This supplementary pivotal movement from the intermediate position to the second locked position has the advantage that during the playing of the record the pin part 11 is clear of the abutment lug 12 which it had previously engaged. In the meantime, during its pivotal movement the plate 14 has pivoted the abutment lever 7 to a position such that during the inwardly directed pivotal movement of the arm 1 the stop pin 4 abuts the abutment step 6, causing the stylus to stop automatically over the lead-in groove of the 30 cm record.

If after the 30 cm record has been played another record of said diameter is played, the entire set-down diameter selection device remains unchanged in the locked position (spring end 20 in notch 17).

Only when a record of a different diameter, in this case a 17 cm record, is to be played will the adjustment be changed. The sensing pin 10 returns to the raised position and the pin part 11 strikes the abutment lug 13 of the plate 14 so that the latter is pivoted counter-clockwise via the intermediate position to the locked position shown in which the pin part 11 is clear of the lug 13.

As the above shows, the abutment lugs 12 and 13 are movable between two locked positions and this movement is performed, in accordance with the adjustment of the sensing pin 10, form one locked position associated with a given record diameter to the other locked position associated with the other record diameter only if after a record has been placed on the turntable the pin occupies a position which differs from the position it occupied during the playing of the preceding record.

FIG. 3 is a plan view of a modified embodiment of a record player according to the invention. The player has a tone arm 25 which is pivotable about a spindle 26 and is coupled to a bracket 27 which follows the pivotal movement of the arm and carries a stop pin 28 which during the clockwise pivotal movement of the arm abuts one of steps 29, 30 and 31 of an abutment lever 32 to limit the movement of the arm in accordance with the diameter of a record placed on a turntable 33. The embodiment of FIG. 3 is intended for playing records of three different diameters, namely 17 cm, 25 cm and 30 cm. In contradistinction to the embodiment shown in FIGS. 1 and 2, the abutment members in the form of bent lugs 34 and 35 are provided on the abutment lever 32 itself, which is pivotable in a plane parallel to the turntable about a spindle 36. The lugs 34 and 35 converge in the direction of rotation (indicated by an arrow A) of the turntable. The lever 32 is formed with three substantially V-shaped notches 37, 38 and 39, one of which is engaged by a resilient pawl element 40 in the form of a roller 41 mounted for free rotation on an end of a spring-loaded lever 42 pivotably mounted in the record player. The position of the lever 32 shown in FIG. 3 in which the roller 41 engages in the notch 39 is the position for playing 17 cm records.

Figure 4A:
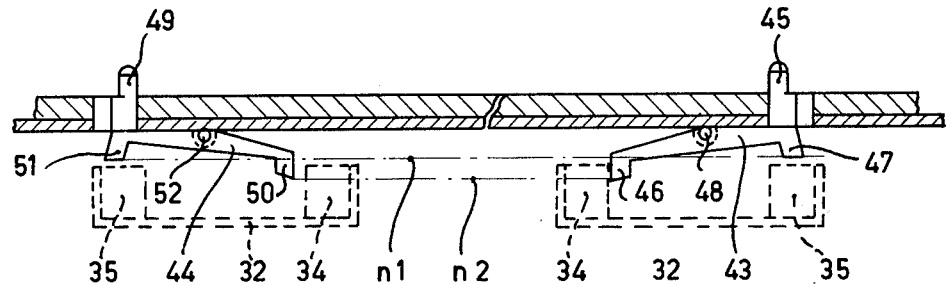
FIGS. 4a, 4b and 4c are sectional views taken on the line IV—IV of FIG. 3 and illustrate positions which the sensing pins occupy when a record having a diameter of 17 cm, 25 cm and 30 cm respectively has been placed on the turntable.
Figure 4B:
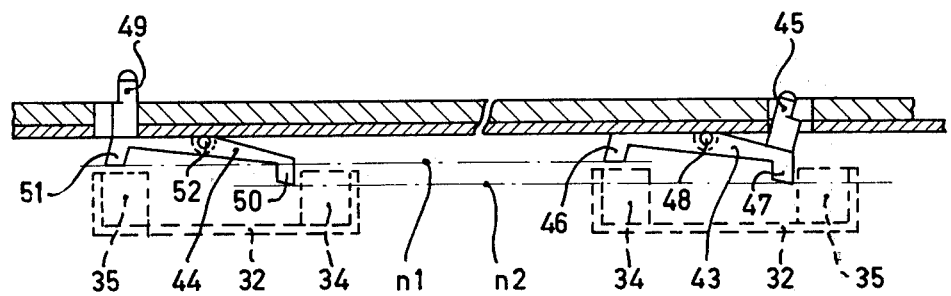
Figure 4C:
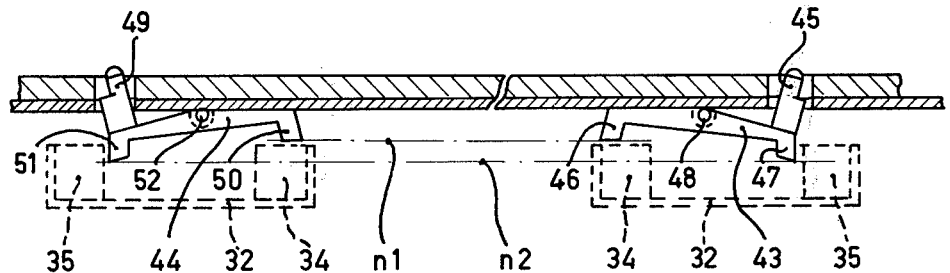

As FIGS. 3 and 4 show, two rockers 43 and 44 are pivotably suspended from the lower surface of the turntable. The rocker 43 comprises a sensing pin 45 which passes through the turntable and two feet 46 and 47 which are spaced by different distances from the turntable center and in accordance with the position of the pin 45 are at one of two levels $n_1$ and $n_2$ relative to the abutment lugs 34 and 35 of the lever 32 (see FIG. 4). The pivot axle 48 of the rocker 43 is positioned so that in the non-depressed condition of the pin 45 the pin projects above the turntable under the influence of the weight of the rocker and that of the pin. The mass distribution relative to the pivot axle 48 is such that the force required to depress the pin is of the order of 1 gram.

The foot 47 of the rocker 43 (on the right in FIG. 4a) which is at the first level $n_1$ is in a raised position relative to the abutment lug 35 such that when the sensing pin 45 is depressed (FIG. 4b), with consequent movement of the foot 47 to the second level $n_2$ and of the other foot 46 from the level $n_2$ to the level $n_1$, the foot 47 engages the lug 35 of the lever 32 and pivots this lug and hence the lever 32 from the locked position shown (the position for playing 17 cm records with the roller 41 engaging in the notch 39) clockwise relative to the spindle 36. The lever 32 initially assumes an intermediate position and then is pivoted further by the roller 41 to another locked position in which the roller 41 snaps into the notch 38. This supplementary pivotal movement from an intermediate position to another locked position causes the foot 47 to be clear of the lug 35 during playing. The rocker 43 and the sensing pin 45 preferably are an integral element made of a synthetic material by injection molding.

The second rocker 44 is constructed similarly to the rocker 43 and comprises a sensing pin 49 and two feet 50 and 51 and a pivot axle 52, the pin 49 being spaced from the turntable center by a larger distance than the pin 45. The said distances are such that when a 17 cm record is placed on the turntable neither of the pins 45 and 49 is depressed, when a 25 cm record is placed on the turntable the pin 45 only is depressed, and when a 30 cm record is placed on the turntable both pins 45 and 49 are depressed, the described situations being shown in FIGS. 4a, 4b and 4c respectively. The circular paths which the feet 46, 47, 50 and 51 describe are indicated by broken lines 46', 47', 50' and 51' respectively in FIG. 3.

FIGS. 3 and 4 show that the displacement or nondisplacement of the sensing pins and the consequent tipping or non-tipping of the rockers enable the feet of the rockers to engage the abutment lugs 34 and 35 of the lever 32 so that depending upon the diameter of a record placed on the turntable the said lever is automatically pivoted to the position associated with the relevant diameter, with the result that the stylus of the arm is automatically stopped over the associated lead-in groove of the record lying on the turntable. The effect of the automatic set-down diameter selection device according to the invention can be summarized as shown in the following table.

| Record diameter | Foot 46 | 50 | 47 | 51 |
|---|---|---|---|---|
| 17 cm | ↓ | ↓ | | |
| 25 cm | | ↓ | ↓ | |
| 30 cm | | | ↓ | ↓ |

Thus after at most one revolution of the turntable the abutment lever 32 is in one of the three possible positions: 17 cm, 25 cm or 30 cm, depending upon the record placed on the turntable.

As FIG. 3 shows, there is secured to the abutment lever 32 a contact lever 53 which cooperates with electrical contacts 54, 55 and 56 by means of which the turntable speed can automatically be set. Hence the speed appertaining to the record to be played will automatically be set together with the automatic selection of the set-down diameter. The contact 54 corresponds to the speed of 45 revolutions per minutes (for 17 cm records) and the contacts 55 and 56 both correspond to the speed of 33 revolutions per minute (for 25 cm and 30 cm records).

It is an essential feature of the invention that a record placed on the turntable itself produces the signal for switching or not-switching the diameter selection device and that switching takes place only if a record having a diameter different from the diameter of the last record to be played is placed on the turntable. This is in contradistinction to the known device in which at the beginning of the playing cycle, irrespective of the diameter of the record placed on the turntable, the abutment lever is always moved from an inoperative position to a position in the path of the sensing pins, which requires the use of a special control mechanism which forms part of a control disc. Although in a record player according to the invention a control disc may be used, it is not necessary, as will be illustrated by the mechanism shown in FIG. 5.

Figure 5:
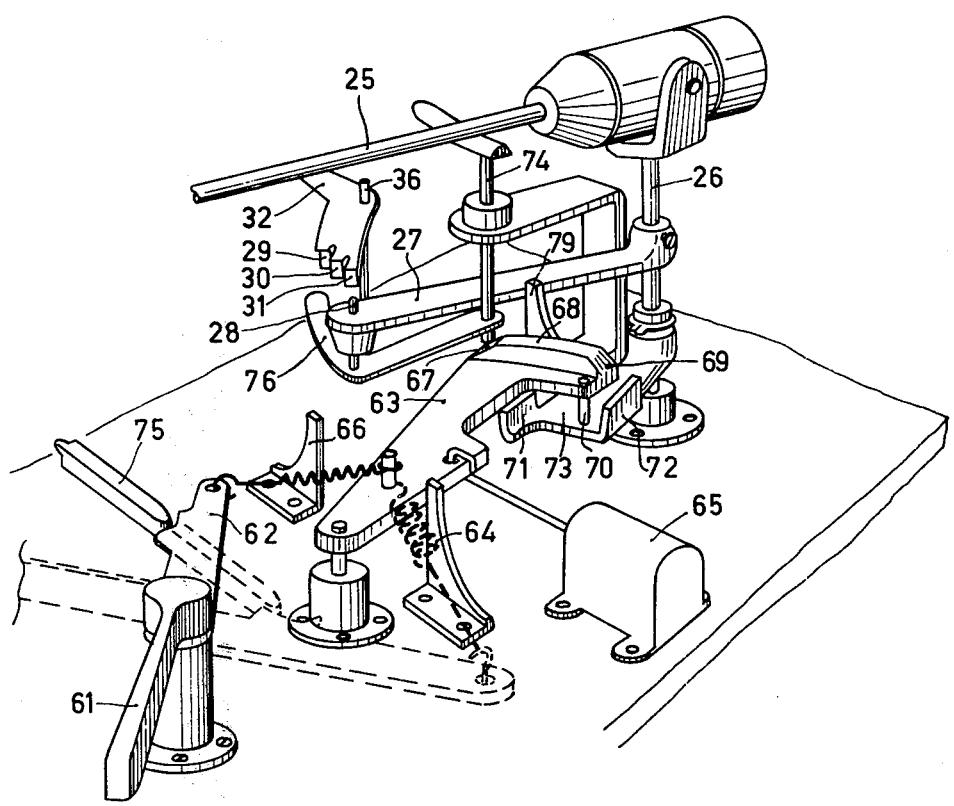
FIG. 5 is a perspective view of an embodiment of a mechanism for moving the tone arm which may be used in the record player of FIG. 3.

When a record has been placed on the turntable an operating handle 61 provided with a bracket 62 is set to the starting position shown in FIG. 5. By means of a switch, not shown, a driving motor, not shown, starts the turntable, the rockers 43 and 44 bringing the abutment lever 32 into the correct position depending upon the record diameter. Immediately after starting by means of the handle 61 a bracket 63 moves from the inoperative position, which is shown in FIG. 5 and in which it engages an abutment stop 64, towards an abutment stop 66, which movement is damped (by means of a dash pot 65). By means of an inclined plane 67 provided on the bracket 63 a lifting device 74 and through this the tone arm 25 are raised. At the same time the stop pin 28, which is arranged so as to be accurately movable in the bracket 27, is moved into the path of the abutment lever 32. After a level surface as a continuation of the inclined plane 76 has arrived under the lifting device 74, a pin 70 mounted on the bracket 63 moves the tone arm inward, i.e. towards the center of the turntable, by engaging an edge 71 of a friction element 73. When a 25 cm record lies on the turntable the sensing pin 28 will strike the step 30 of the abutment lever 32 at the instant at which the stylus is over the lead-in groove of the record. The tone arm then stops its inward movement, but the bracket 63 continues moving and the friction element 73 slides over the spindle 26 of the tone arm until an inclined plane 69, which is an extension of the surface 68, causes the lifting device 74 and hence the tone arm to descend. The bracket 63 is stopped by the abutment stop 66. The sensing pin 28 has descended below the level of the abutment lever 32, so that the tone arm is free to play the record. When the stylus enters the lead-out groove of the record a switch off mechanism, not shown, briefly moves forward a rod 75 which returns the handle 61 and the bracket 62 to the stop position indicated by broken lines. If desired, the handle can be returned to the stop position by hand before the end of the record. Thus not only is the motor switched off but also the bracket 63 returns towards the stop abutment 64, which return movement is again damped by the dash pot 65. During this movement the arm is raised by means of the inclined plane 69 and the lifting device 74; when the level area 68 is under the lifting device 74, the pin 70 strikes an edge 72 of the friction element 73 and the tone arm is moved outward until its bracket 27 strikes an abutment stop 79. Subsequently the tone arm will be lowered via the inclined plane 67, and the bracket 63 is stopped in engagement with the abutment stop 64. During the return movement of the tone arm the stop pin 28 may strike the abutment lever 32, because the lifting device 74 together with a supporting bracket 76 coupled to it still is in the raised position. This is prevented by the construction of the pin 28 which is axially split and can be depressed by a very small force, so that during the return movement of the tone arm the pin 28 temporarily slides along the lower surface of the abutment lever 32 with a slight spring pressure.

What is claimed is:

1. An apparatus for automatically controlling the pick-up arm set-down diameter in a record player comprising a turntable having a surface on which a record may be placed and an axis perpendicular to said surface about which axis the turntable is rotatable; at least one sensing pin so connected to the turntable as to be disposed in a raised position projecting above said surface in the absence of a record, having a diameter less than a first given diameter, on the turntable, and in a depressed position in response to placement of a record greater than said given diameter on the turntable; a tone-arm assembly, comprising a tone-arm, means for mounting the tone-arm for pivotal motion about an axis parallel to the turntable axis, and a stop bracket for limiting pivoting of the arm toward the axis of the turntable; and abutment means for engaging said stop bracket at one of a plurality of bracket positions to limit said pivoting, each bracket position corresponding to a set-down diameter of the tone-arm corresponding to a pin position, wherein said abutment means comprises an abutment plate movable between at least a first locked position and a second locked position closer to said turntable axis than said first locked position, each locked position corresponding to a set-down diameter, said abutment plate comprisng at least first and second abutment members; and said apparatus further comprises means responsive to the position of said sensing pin for engaging at least one of said abutment members when the abutment plate position corresponds to a set-down diameter different from that corresponding to the sensing pin position, and for moving said abutment plate toward the locked position corresponding to that pin position, said position responsive means comprising a first abutment element for engaging said first abutment member so as to move said first member toward the turntable axis thereby moving said abutment plate from said first position toward said second position, and a second abutment element for engaging said second abutment member so as to move said second member away from the turntable axis thereby moving said plate from said second plate position toward said first position; and means for releasably locking said abutment plate in each locked position.

2. An apparatus as claimed in claim 1 wherein said turntable has an undersurface, said position responsive means comprises a rocker, pivotally mounted on said under surface, comprising end elements spaced from the turntable axis by different distances, said end elements being said first and second abutment elements, said rocker having positions corresponding to said raised and depressed pin positions respectively; in one of said pin positions said first abutment element being in a first position clear of engagement with said first abutment members, and the second abutment element being in a second position for engagement with said second abutment member when said abutment plate is in a position corresponding to a set-down diameter corresponding to the other pin position; in the other pin position the second abutment element being in a first position clear of engagement with said second abutment members, and the first abutment element being in a second position for engagement with first abutment member when said abutment plate is in a position corresponding to a set-down diameter corresponding to said one pin position.

3. An apparatus as claimed in claim 2 wherein said rocker pivot mounting is arranged such that a force of approximately 1 gram is required to move said pin from said raised to said depressed position, and in the absence of a record on the turntable having a diameter greater than said given diameter, said pin projects above the turntable under the influence of gravity on unbalanced rocker weight.

4. An apparatus as claimed in claim 1, wherein said apparatus comprises two sensing pins and position responsive means spaced at different distances from the turntable axis, whereby record diameters with respect to two different given diameters can be sensed.

5. An apparatus as claimed in claim 1, wherein said abutment members comprise two inner abutment surfaces on said abutment plate said surfaces converging in the direction of rotation of the turntable.

6. An apparatus as claimed in claim 5, comprising a vertically movable element connected to said pin for movement in response to pin movement, and wherein said first and second abutment elements are inner and outer portions respectively, with respect to the turntable center, of said vertically movable element.

7. An apparatus as claimed in claim 6 wherein said plate is pivotally mounted for movement toward and away from said turntable axis; and said locking means comprises a plurality of notches in said plate, a pawl, and means for biasing the pawl into engagement with a corresponding one of said notches.

8. An apparatus as claimed in claim 1, wherein said apparatus further comprises electrical contact means for selecting turntable speed in response to the position of said abutment members, each locked position corresponding to a given speed.

* * * * *